(12) United States Patent
Menezo et al.

(10) Patent No.: US 11,971,591 B2
(45) Date of Patent: Apr. 30, 2024

(54) PHOTONIC ASSEMBLY COMPRISING A PHOTONIC COMPONENT OPTICALLY COUPLED WITH A PHOTONIC ELEMENT

(71) Applicant: Scintil Photonics, Grenoble (FR)

(72) Inventors: Sylvie Menezo, Grenoble (FR);
Frédéric Mazur, Grenoble (FR)

(73) Assignee: Scintil Photonics, Grenoble (FR)

( * ) Notice: Subject to any disclaimer, the term of this patent is extended or adjusted under 35 U.S.C. 154(b) by 0 days.

(21) Appl. No.: 17/836,870

(22) Filed: Jun. 9, 2022

(65) Prior Publication Data
US 2022/0397729 A1 Dec. 15, 2022

(30) Foreign Application Priority Data

Jun. 9, 2021 (FR) ...................................... 2106060

(51) Int. Cl.
*G02B 6/42* (2006.01)
*G02B 6/28* (2006.01)

(52) U.S. Cl.
CPC ......... *G02B 6/4225* (2013.01); *G02B 6/4207* (2013.01); *G02B 6/4214* (2013.01); *G02B 6/4243* (2013.01)

(58) Field of Classification Search
CPC .................................. G02B 6/28; G02B 6/42
USPC .......................................................... 385/16
See application file for complete search history.

(56) References Cited

U.S. PATENT DOCUMENTS

| | | | |
|---|---|---|---|
| 6,724,968 B2* | 4/2004 | Lackritz | G02B 6/42 385/141 |
| 7,263,247 B1* | 8/2007 | Hehlen | G02F 1/0955 385/24 |
| 8,285,092 B2 | 10/2012 | Deki et al. | |
| 9,316,788 B2* | 4/2016 | Witzens | G02B 6/13 |
| 9,335,480 B1* | 5/2016 | Celo | G02B 6/3656 |
| 2004/0218870 A1* | 11/2004 | Blauvelt | G02B 6/2746 385/50 |
| 2010/0210952 A1* | 8/2010 | Taira | A61B 5/0075 250/214 LA |
| 2017/0254959 A1* | 9/2017 | Miao | G02B 6/4263 |
| 2021/0063779 A1* | 3/2021 | Janta-Polczynski | G02F 1/0955 |
| 2022/0214568 A1* | 7/2022 | Srinivasan | G02F 1/0955 |

FOREIGN PATENT DOCUMENTS

CN 1685256 A * 10/2005 ......... G02B 6/12002

OTHER PUBLICATIONS

French Search Report for Application No. 2106060 dated Feb. 22, 2022, 2 pages.

* cited by examiner

*Primary Examiner* — Kaveh C Kianni
(74) *Attorney, Agent, or Firm* — TraskBritt (57) ABSTRACT

A photonic assembly comprises: a photonic device comprising an output guide and an input guide cooperating with, respectively, a first output and a first input; a photonic element having a second output and a second input optically coupled to the first input and the first output; an optical isolator interposed in a first path between the first output and the second input, and imposing a first size on radiation propagating along the first path; and adjustment means interposed in a second path between the first input and the second output, the adjustment means being configured to impose on radiation propagating along the second path a second size equal to the first size.

18 Claims, 9 Drawing Sheets

PHOTONIC ASSEMBLY COMPRISING A PHOTONIC COMPONENT OPTICALLY COUPLED WITH A PHOTONIC ELEMENT

CROSS-REFERENCE TO RELATED APPLICATION

Pursuant to 35 U.S.C. § 119(a), this application claims the benefit of the filing date of French Patent Application Serial No. 2106060, filed Jun. 9, 2021, for "PHOTONIC ASSEMBLY COMPRISING A PHOTONIC COMPONENT OPTICALLY COUPLED WITH A PHOTONIC ELEMENT," the disclosure of which is hereby incorporated herein in its entirety by this reference.

TECHNICAL FIELD

The present disclosure relates to the field of photonics and, more particularly, to an assembly of a photonic device and an external photonic element. In particular, the present disclosure relates to the optimization of the optical coupling between the photonic device and the photonic element.

BACKGROUND

The emergence of photonic components in the fields of guided optical communications has been accompanied by the development of means and methods of optical coupling between different photonic components or circuits (photonic devices) and other photonic elements such as optical fibers. In particular, an assembly between a photonic device provided with a laser source and an external photonic element such as an optical fiber is known.

Figure 1:
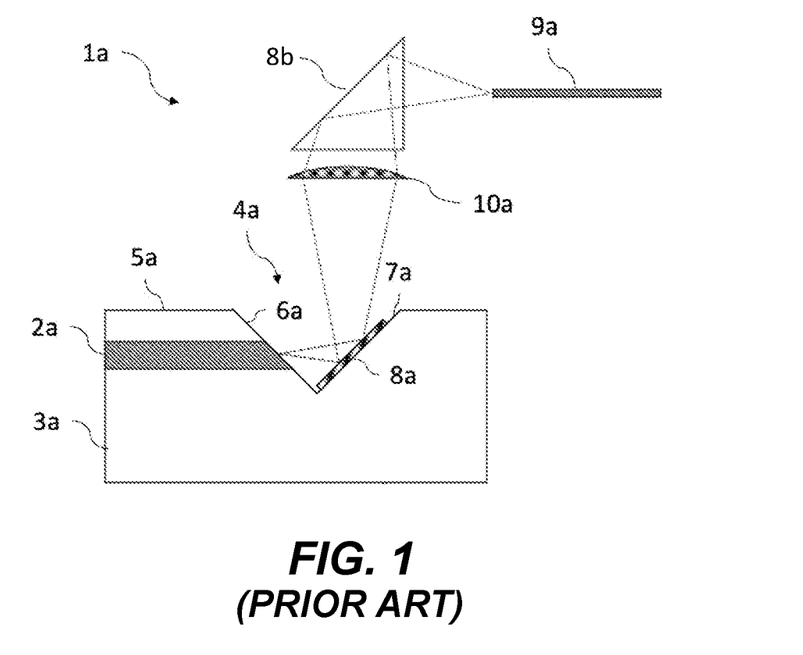
FIG. 1 is a schematic representation of a photonic device, according to a cross-sectional plane of the device, known in the prior art, and illustrating a mode of optical coupling through the surface with a photonic element not shown.
Figure 2:
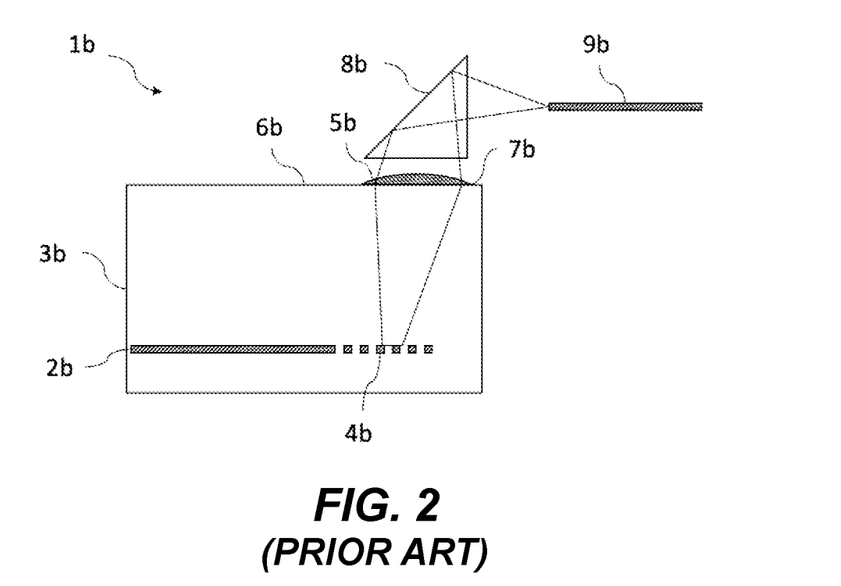
FIG. 2 is a schematic representation of another photonic device, according to a cross-sectional plane of the device, known in the prior art, and illustrating a mode of optical coupling through the surface with another photonic element.

By way of example, FIG. 1 and FIG. 2 each illustrate a coupling, known as surface coupling, between a photonic device and an external photonic element. In particular, FIG. 1 shows a photonic device 1a provided with a waveguide 2a, buried in a substrate 3a. A cavity 4a is also formed from a front face 5a of the photonic device 1a. The cavity includes, in particular, two faces 6a and 7a. In particular, the cavity 4a is formed so that the waveguide 2a opens out along one of its ends through the face 6a. The photonic device 1a also comprises a mirror 8a, resting on the face 7a. Such an arrangement makes it possible to extract, from the photonic device 1a, a radiation, for example, emitted by a laser (not shown) and guided by the waveguide 2a. In particular, a radiation emerging through the face 6a is reflected by the mirror or reflector element 8a in a direction outside a plane formed by the front face 5a. The use of a lens 10a and a prism 8b makes it possible to redirect the extracted radiation toward an input of a photonic element 9a that comprises, for example, a waveguide or an optical fiber.

FIG. 2 shows another photonic device 1b provided with a waveguide 2b, buried in a substrate 3b. The waveguide 2b is further terminated along one of its ends by a diffraction grating 4b. In particular, the diffraction grating 4b is configured to project light radiation, for example, emitted by a laser (not shown) and guided by the waveguide 2b, in the direction of an output 5b disposed on a front face 6b of the photonic device 1b. Such an arrangement thus allows extraction of a light radiation through the front face 6b of the photonic device 1b. The use of a lens 7b and a prism 8b allows the extracted radiation to be redirected to an input of a photonic element 9b that comprises, for example, a waveguide or an optical fiber.

Figure 3:
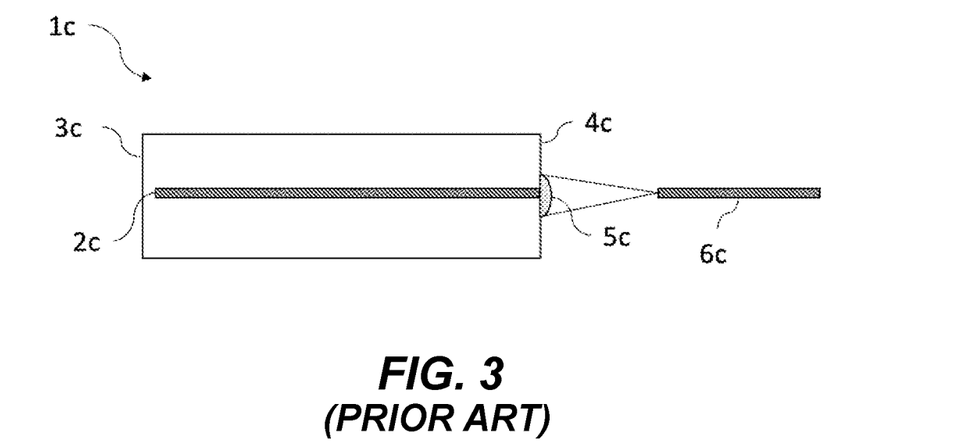
FIG. 3 is a schematic representation of another photonic device, according to a cross-sectional plane of the device, known in the state of the art, and illustrating a mode of wafer coupling.

Also as an example, FIG. 3 illustrates a so-called edge-coupling mode between a photonic device 1c and a photonic element 6c. The photonic device 1c is provided with a waveguide 2c, buried in a substrate 3c. The waveguide 2c opens, by one of its ends, on a side face 4c (or wafer) of the photonic device 1c. In other words, a radiation, emitted, for example, by a laser (not shown) and guided by the waveguide 2c, is extracted from the photonic device 1c directly through the lateral face 4c of the latter. A lens 5c can then be implemented to couple the extracted radiation to a photonic element 6c that comprises, for example, a waveguide.

However, there are situations in which it is desirable to ensure unidirectional propagation of light radiation when it is extracted from the photonic device. Indeed, the radiation extracted from a photonic device is likely to undergo reflections and, thus, to be partly reinjected in the photonic device and ultimately in the laser that produced it. This phenomenon has the effect of degrading the emission spectrum of the laser and, consequently, the performance of the photonic device.

Figure 4:
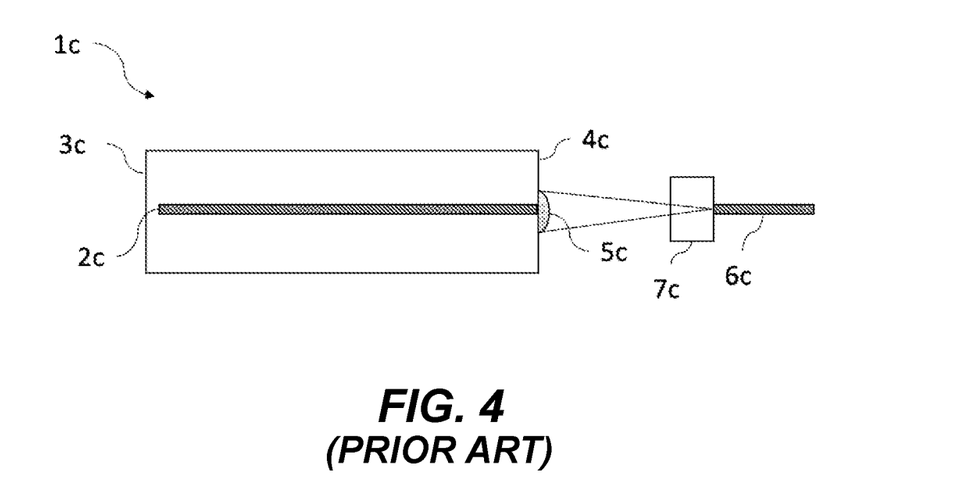
FIG. 4 illustrates the implementation of an optical isolator for coupling between the photonic device and the photonic element shown in FIG. 3.

In order to overcome this problem, it is generally proposed to use an optical isolator placed in the path of the extracted radiation between the photonic device and the photonic element to be optically coupled. FIG. 4 shows, as an example, the device of FIG. 3 in which an optical isolator 7c is interposed between the lens 5c and the input of the photonic element 6c. The optical isolator imposes a light propagation in a unique direction and avoids the parasitic reflections likely to affect the performances of the photonic device.

Figure 5:
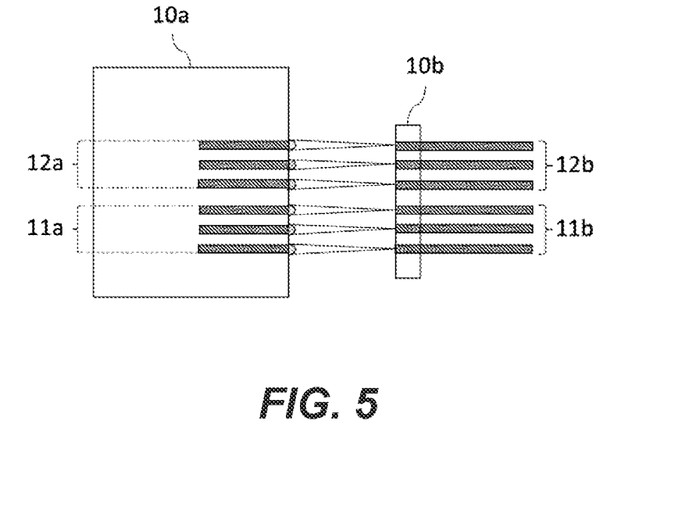
FIG. 5 is a schematic representation of an assembly of a first photonic component and a second photonic component optically coupled together.

Nevertheless, this solution has limitations when the photonic device comprises, in addition to a light extraction, areas, so-called input areas, through which radiation can be injected into the photonic device. In this regard, FIG. 5 is an illustration of an optical edge coupling, as viewed from above, of a photonic device 10a with a photonic component 10b. The photonic device 10a may include an array of lasers (not shown, integrated or not) whose radiation is guided by waveguides, so-called first extraction waveguides 11a. The photonic device 10a also includes waveguides, referred to as first input waveguides 12a, and intended to receive external light radiation. The photonic component 10b includes second extraction waveguides 12b and second input waveguides 11b optically coupled, respectively, with the first input waveguides 12a and the first extraction waveguides 11a. The photonic component 10b may be a passive component, and include, for example, an optical fiber grating.

According to this arrangement, light rays are likely to propagate in two opposite directions. In particular, a first series of rays is likely to propagate from the first extraction waveguides 11a to the second input waveguides 11b. Equivalently, a second series of rays is likely to propagate from the second extraction waveguides 12b to the first input waveguides 12a.

Also, in order to optimize the coupling performance, the first and second series of rays must have a substantially equivalent mode size. However, the use of an optical isolator to ensure unidirectionality on the propagation path of the first series of rays is not without consequences. Indeed, the optical isolator modifies the mode size of the first series of rays so that they no longer have a mode size substantially equivalent to that of the second series of rays. In other words, the implementation of an optical isolator, without any other precautions, does not allow to optimize the couplings between the first extraction waveguides 11a and the second input waveguides 11b on the one hand and between the second extraction waveguides 12b and the first input waveguides 12a on the other hand.

An aim of the present disclosure is therefore to provide an optical coupling between a photonic device and a photonic element and to overcome the above-mentioned drawbacks.

BRIEF SUMMARY

The aim of the disclosure is achieved by a photonic assembly that comprises:
- a photonic device comprising a first block provided with at least one output guide and at least one input guide cooperating with, respectively, at least one first output and at least one first input arranged on a first face of the first block;
- a photonic element with at least one second output and at least one second input, arranged on a second side of the photonic element, and optically coupled with the at least one first input and the at least one first output, respectively;
- an optical isolator interposed on the light propagation path, referred to as the first path, between the at least one first output and the at least one second input, and imposing a first mode size on a radiation propagating along the first path; and
- adjustment means interposed on the light propagation path, referred to as the second path, between the at least one first input and the at least one second output, the adjustment means being configured to impose on a radiation, propagating along the second path, a second mode size equal to the first mode size.

According to a mode of implementation, the adjusting means comprises a blade of a thickness Te, and the blade being made of a material of optical index Ne, the thickness Te and the optical index Ne being adjusted so that the second mode size is equal to the first mode size.

According to a mode of implementation, the optical isolator has an optical index Ni and a thickness Ti, and is combined with a first material of optical index Noi and cumulative thickness Toi interposed on the first path, the blade is combined with a second material of optical index Noe and cumulative thickness Toe interposed on the second path, the optical index Ni, the thickness Ti, the optical index Noi, the cumulative thickness Toi, the optical index Noe, the cumulative thickness Toe, the optical index Ne and the thickness Te respecting the following relationship:

$$\frac{Te}{Ne} + \frac{Toe}{Noe} = \frac{Ti}{Ni} + \frac{Toi}{Noi}$$

According to a mode of implementation, the photonic assembly is provided with active alignment means that include a first alignment input, a first alignment output, a second alignment input and a second alignment output selected from, respectively, the at least one first input, the at least one first output the at least one second input and the at least one second output, the first alignment output and the second alignment input are optically coupled and define a first alignment path in that order, the second alignment output and the first alignment input are optically coupled and define a second alignment path in that order.

According to a mode of implementation, the active alignment means are arranged such that light radiation entering the photonic component through the first alignment input exits through the first alignment output or such that light radiation entering the photonic element through the second alignment input exits through the second alignment output.

According to a mode of implementation, the active alignment means comprise an alignment laser and a photo detector arranged according to a first arrangement or a second arrangement, the first arrangement allows a radiation emitted by the alignment laser, before reaching the photo detector, to follow in order the first alignment path and the second alignment path, while the second arrangement allows a radiation emitted by the alignment laser, before reaching the photo detector, to follow in order the second alignment path, the first arrangement allows radiation emitted by the alignment laser, before reaching the photodetector, to follow the first alignment path and the second alignment path in order, while the second arrangement allows radiation emitted by the alignment laser, before reaching the photodetector, to follow the second alignment path and the first alignment path in order.

According to a mode of implementation, the first face and the second face are facing each other, the optical isolator and the beam adjustment means being interposed, respectively, between the at least one first output and the at least one second input on the one hand, and between the at least one first input and the at least one second output on the other hand.

According to a mode of implementation, the at least one output guide terminates along one of its ends with the at least one first output and the at least one input guide terminates along one of its ends with the at least one first input.

According to a mode of implementation, the at least one exit guide and at least one entry guide extend in a plane parallel to the first face.

According to a mode of implementation, the at least one output guide terminates along one of its ends with a diffraction grating in correspondence with the at least one first output, and the at least one input guide terminates along one of its ends with another diffraction grating in correspondence with the at least one first input.

According to a mode of implementation, the photonic assembly comprises a prism disposed on the first path and the second path.

According to a mode of implementation, the photonic device comprises at least one laser cooperating with the at least one output guide.

According to a mode of implementation, the photonic element comprises an array of optical fibers resting in grooves of a second block bearing the second face, advantageously, the optical fibers comprise an end flush with the second face.

According to a mode of implementation, the photonic device comprises lenses resting on the first face and cooperating with the at least one first input and the at least one first output.

The disclosure also relates to a method of forming a photonic assembly that includes the following steps:
- a step of providing a photonic device comprising a first block provided with at least one output guide and at least one input guide cooperating with, respectively, at least one first output and at least one first input arranged on a first face of the first block;
- a step of providing a photonic element with at least one second output and at least one second input, arranged on a second side of the photonic element;
- a step including placing an optical isolator interposed on the light propagation path, referred to as the first path, between the at least one first output and the at least one second input, and imposing on a radiation, propagating along the first path, a first mode size;

a step including in arranging adjustment means interposed on the light propagation path, referred to as the second path, between the at least one first input and the at least one second output, the adjustment means being configured to impose on a radiation, propagating along the second path, a second mode size equal to the first mode size;

the method further comprising an optical coupling step for optically coupling the at least one second output and the at least one second input with the at least one first input and the at least one first output, respectively.

According to a mode of implementation, the adjusting means comprises a blade of a thickness Te, and the blade being made of a material of optical index Ne, the thickness Te and the optical index Te being adjusted so that the second mode size is equal to the first mode size.

According to a mode of implementation, the optical isolator has an optical index Ni and a thickness Ti, and is combined with a first material of optical index Noi and cumulative thickness Toi interposed on the first path, the blade is combined with a second material of optical index Noe and cumulative thickness Toe interposed on the second path, the optical index Ni, the thickness Ti, the optical index Noi, the cumulative thickness Toi, the optical index Noe, the cumulative thickness Toe, the optical index Ne and the thickness Te respecting the following relationship:

$$\frac{Te}{Ne} + \frac{Toe}{Noe} = \frac{Ti}{Ni} + \frac{Toi}{Noi}$$

According to a mode of implementation, the optical coupling step implements active alignment means. The active alignment means comprise a first alignment input, a first alignment output, a second alignment input and a second alignment output selected from, respectively, the at least one first input, the at least one first output, the at least one second input and the at least one second output. The first alignment output and the second alignment input are optically coupled and define in that order a first alignment path. The second alignment output and the first alignment input are optically coupled and define in that order a second alignment path. The optical coupling step comprises emitting light radiation, which, when it travels along one of the first or second alignment path, then travels along the other of the first or second alignment path.

According to a mode of implementation, the active alignment means are arranged such that light radiation entering the photonic device through the first alignment input exits through the first alignment output or such that light radiation entering the photonic element through the second alignment input exits through the second alignment output.

According to a mode of implementation, the optical coupling step comprises the emission of a light radiation by an alignment laser and the detection of the radiation by a photodetector, the alignment laser and the photodetector being arranged according to a first arrangement or a second arrangement, the first arrangement allows a radiation emitted by the alignment laser the first arrangement allows radiation emitted by the alignment laser, before reaching the photodetector, to follow the first alignment path and the second alignment path in order, while the second arrangement allows radiation emitted by the alignment laser, before reaching the photodetector, to follow the second alignment path and the first alignment path in order.

BRIEF DESCRIPTION OF THE DRAWINGS

Further features and advantages of the disclosure will be apparent from the following detailed description with reference to the accompanying figures, in which.

DETAILED DESCRIPTION

The disclosure relates to a photonic assembly having a photonic device and a photonic element optically coupled to each other.

In particular, the photonic device comprises a first block provided with at least one output guide and at least one input guide cooperating with, respectively, at least one first output and at least one first input arranged on a first face of the block.

The photonic element is provided with at least one second output and at least one second input, arranged on a second side of the photonic element. In this respect, the at least one second output and the at least one second input are optically coupled with the at least one first input and the at least one first output, respectively.

The photonic assembly also includes an optical isolator interposed on the light propagation path, referred to as the first path, between the at least one first output and the at least one second input. Furthermore, the optical isolator imposes a first mode size ("Waist") on radiation propagating along the first path.

The photonic assembly finally comprises adjustment means interposed on the light propagation path, referred to as the second path, between the at least one first input and the at least one second output. In this respect, the adjustment means are configured to impose to a radiation, propagating along the second path, a second mode size equal to the first mode size.

By "optically coupled" is meant an input and an output arranged so that light radiation from the output is injected into the input. It is understood in the terms of the present disclosure that an input is an optical input, and an output is an optical output. In other words, light radiation incident on an optical input will be injected into the component (device or element) under consideration. Equivalently, a light beam can be extracted by an optical output of the component (device or element) considered.

According to the present disclosure, a guide is a waveguide. Furthermore, once a guide cooperates with an output within a photonic device, radiation guided by the guide is capable of being extracted from the photonic device through the output. Equivalently, whenever a guide cooperates with an input within a photonic device, radiation injected into the photonic device through the input will be guided by the guide.

As described in the following, the cooperation between a guide and an outlet or inlet can be reduced to the simple identification of an end of the guide at the inlet or outlet. Alternatively, this cooperation between a guide and an inlet or outlet can involve a diffraction grating.

Figure 6:
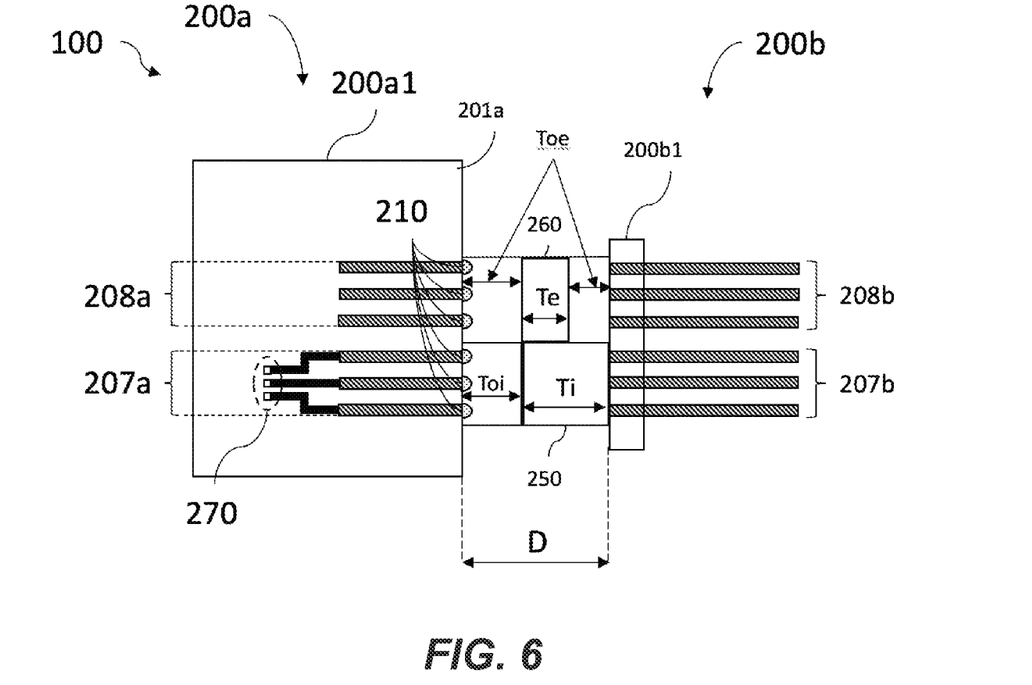
FIG. 6 is a schematic representation of a photonic assembly according to a first embodiment of the present disclosure, in particular, the photonic assembly is shown in a cross-sectional plane perpendicular to the first and second faces, and which includes the photonic device and photonic element guide assembly.

Thus, FIG. 6 depicts a photonic assembly 100 according to a first embodiment of the present disclosure and associated with edge coupling. Notably, the photonic assembly 100 includes a photonic device 200a and a photonic element 200b.

Figure 7:
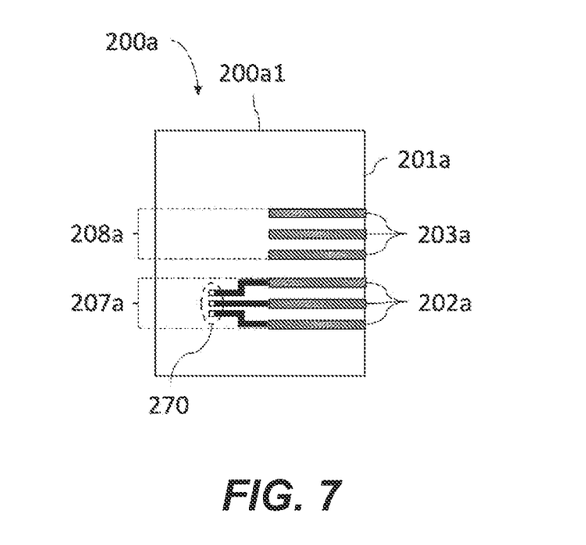
FIG. 7 is a schematic representation of the photonic device of FIG. 6 and represented according to the same modalities of FIG. 6.

In this regard, the photonic device 200a includes a first block 200a1. As illustrated in FIG. 7, the first block 200a1 includes a face referred to as the first face 201a on which at least one first output 202a and at least one first input 203a are formed or arranged.

The photonic device may also include lenses 210 resting on the first face 201a and cooperating with the at least one first input 203a and the at least one first output 202a. More particularly, each first output 202a is associated with a lens of its own, such that light radiation extracted by the first output passes through the lens in question. Equivalently, each first input 203a is associated with a lens of its own, such that light radiation, before being injected through the first input, passes through the lens under consideration.

The first block 200a1 also includes waveguides and, more particularly, at least one output guide 207a and at least one input guide 208a. Notably, the at least one output guide 207a cooperates with the at least one first output 202a, while the at least one input guide 208a cooperates with the at least one first input 203a.

Thus, light radiation guided by the at least one output guide 207a can be extracted, from the first block 200a1, through the at least one first output 202a with which it cooperates. In an equivalent manner, a light radiation injected into the first block 200a1 by the at least one first input 203a will be guided by the at least one input guide 208a.

The light radiation that can be guided by the at least one output guide 207a comes from one or more light sources, for example, one or more lasers, or even an array of lasers.

The one or more light sources may be integrated with the photonic device 200a, or even with the first block 200a1, or simply be external to the photonic device 200a.

As an example, the photonic device 200a of FIG. 6 includes three output guides 202a, and an array of lasers 270 integrated into the first block 200a1. Notably, each laser 270 is specifically associated with an output guide 207a so that light radiation emitted by the laser in question is guided by the output guide with which it is associated. The disclosure is not, however, limited to this arrangement alone, and the person skilled in the art will be able to envisage any other configuration in terms of integration and number of lasers.

It is notable that radiation emitted by a laser source is polarized along a preferred direction. Thus, and without the need to specify, the photonic device 200a is configured to allow propagation and/or guidance of light radiation (laser) polarized along a predetermined direction.

According to this first embodiment, the at least one output guide 207a terminates along one of these ends in the at least one first output 202a, while the at least one input guide 208a terminates along one of these ends in the at least one first input 203a. In other words, the end of the at least one output guide 207a forming the at least one first output 202a is flush with the first face 201a. Equivalently, the end of the at least one input guide 208a forming the at least one first input 203a is flush with the first face 201a.

According to the present disclosure, the waveguides of the first block 200a1 may include silicon nitride or silicon embedded in a silicon oxide matrix.

Figure 8:
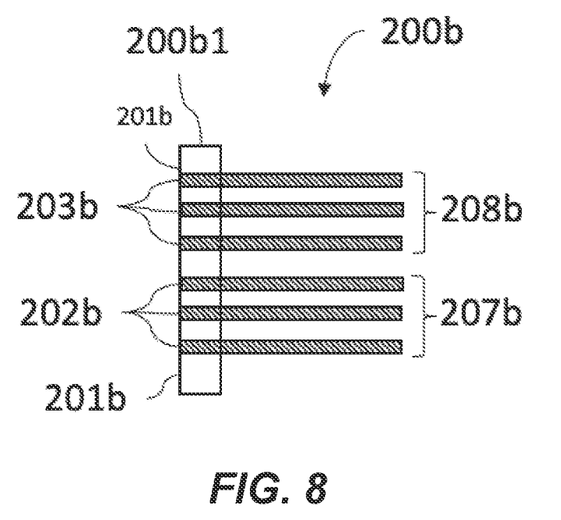
FIG. 8 is a schematic representation of the photonic element of FIG. 6 and represented according to the same modalities of FIG. 6.

The photonic assembly 100 also includes a photonic element 200b (FIG. 6 and FIG. 8). The photonic element 200b, like the first block 200a1, includes a second face 201b on which at least one second output 203b and at least one second input 202b are formed. According to the present disclosure, the photonic element 200b and the photonic device 200a are arranged such that the at least one second output 203b and the at least one second input 202b are optically coupled with, respectively, the at least one first input 203a and the at least one first output 202a.

Thus, light radiation extracted from the photonic device 200a through the at least one first output 202a will be injected into the photonic element 200b through the at least one second input 202b. Equivalently, light radiation extracted from the photonic element 200b through the at least one second output 203b will be injected into the photonic device 200a through the at least one first input 203a.

To this end, and according to the first embodiment, the first face 201a and the second face 201b face each other. More particularly, the first face 201a and the second face 201b are spaced apart by a distance D.

The photonic element 200b according to the present disclosure may comprise an optical fiber array and, more particularly, at least one input fiber 207b and at least one output fiber 208b. Notably, the at least one input fiber 207b cooperates with the at least one second input 202b (FIG. 8). Equivalently, the at least one output fiber 208b cooperates with the at least one second output 203b.

For example, the at least one input fiber 207b terminates along one end thereof in the at least one second input 202b, while the at least one output fiber 208b terminates along one end thereof in the at least one second output 203b. In other words, the end of the at least one input fiber 207b forming the at least one second input 202b and the end of the at least one output fiber 208b forming the at least one second output 203b are flush with the second face 201b. According to this configuration, the second face can be carried by a second block 200b1 provided with V-grooves, and in which the optical fibers are mounted.

The photonic assembly 100 also includes an optical isolator 250 interposed in the light propagation path, referred to as the first path, between the at least one first output 202a and the at least one second input 202b. It is clear, however, without the need to specify, that the optical isolator 250 does not interpose between the at least one second output 203b and the at least one first input 203a. In particular, the optical isolator 250 has an optical index Ni, and a thickness Ti measured along the direction defined by the first path.

The optical isolator may, for example, be bonded to either of the first and second faces. According to this first embodiment, the optical isolator is bonded to the second face.

The optical isolator 250 may be combined with a first material of index Noi and cumulative thickness Toi interposed on the first path. In other words, radiation traveling along the first path will pass through the optical isolator 250 and a thickness Toi of the first material. For example, the first material may fill the gap left between the optical isolator 250 and the first and/or second face. The first material may include air, or a dielectric material.

The "first path" defines a direction of propagation of light radiation from the at least one first output 202a to the at least one second input 202b.

An optical isolator 250 according to the terms of the present disclosure is an optical component that allows light to propagate in one direction. In particular, such a component may comprise a Faraday rotator interposed between a first polarizer and a second polarizer whose optical axis is offset by 45° from that of the polarizer.

Thus, only one component, referred to as the useful component of radiation, oriented along the optical axis of the first polarizer is transmitted by the latter to the Faraday rotator. When it passes through the Faraday rotator, the polarization of the useful component is rotated by 45° before reaching the second polarizer. The useful component, having a polarization parallel to the optical axis of the polarizer, is then transmitted by the latter to form the output radiation. It is therefore understood that an input radiation having a polarization perpendicular to the optical axis of the polarizer will not be transmitted by the optical isolator. It is also understood that a radiation incident on the second polarizer, whatever its polarization, will not be transmitted by the optical isolator. This last aspect, well known in the art, has its origin in the non-reciprocal character of the Faraday rotator.

The optical isolator 250 is thus arranged to allow propagation of light radiation from the at least one first output 202a to the at least one second input 202b along the first path. The implementation of the optical isolator 250 eliminates stray reflections that a light beam is likely to experience along the first path. The elimination of parasitic reflections prevents any return of light radiation to the laser or lasers, and thus limits the degradation of their performance.

The implementation of the optical isolator 250 imposes a first mode size (mode size="Waist") on a light radiation, propagating along the first path. Also, for this purpose, the distance D between the first face 201a and the second face 201b is generally adjusted so as to account for this phenomenon and thus optimize the optical coupling between the at least one first output 202a and the at least one second input 202b.

However, this adjustment is not without consequences for the efficiency or optimization of the coupling between the at least one second output 203b and the at least one first input 203a. In particular, and without further precautions, light radiation propagating along a second path from the at least one second output 203b to the at least one first input 203a will not be imposed the first mode size.

Thus, in order to alleviate this problem, it is proposed to implement adjustment means 260 interposed on the light propagation path, between the at least one first input 203a and the at least one second output 203b. In particular, the adjustment means 260 are configured to impose on a radiation, propagating along the second path, a second mode size substantially equal to the first mode size. It is clear, without needing to be stated, that the adjustment means 260 do not interpose between the at least one first output 202a and the at least one second input 202b.

The implementation of a second optical isolator as an adjusting means and oriented to let light radiation pass from the at least one second output to the at least one first input is not desirable. Indeed, the polarization of a radiation guided by a fiber of the photonic element is not known so that the radiation could be partially transmitted, or even blocked, if an optical isolator were to be implemented as adjustment means. The simple implementation of a second optical isolator would block all or part of the signal.

As an example, the adjustment means 260 may include a blade having a thickness Te, and the blade being made of a material of optical index Ne. The thickness Te and the optical index Te being adjusted so that the second mode size is substantially equal to the first mode size (it is understood that the thickness Te is measured along a direction defined by the faces of the blade parallel to the first and second faces).

For example, the blade can be glued to either of the first and second sides. According to this first embodiment, the blade is glued to the second side.

The adjustment can include the consideration of an optical index Ne, advantageously higher than the optical index Ni. This configuration is particularly advantageous in that it makes it possible to space out (increase the distance "D") the first face and the second face, and consequently facilitates the assembly process of the photonic device and the photonic element.

Alternatively or additionally, the blade 260 may be combined with a second material of index Noe and cumulative thickness Toe interposed on the second path. In other words, radiation travelling along the second path will pass through the blade 260 and a thickness Toe of the second material. For example, the second material may fill the gap left between the blade 260 and the first and/or second side. The second material may include air or a dielectric material.

According to this alternative, the adjustment can be carried out by imposing on the quantities Te, Ne, Toe, Noe, Ti, Ni, Toi and Noi to respect the following relation:

$$\frac{Te}{Ne} + \frac{Toe}{Noe} = \frac{Ti}{Ni} + \frac{Toi}{Noi}$$

Figure 9:
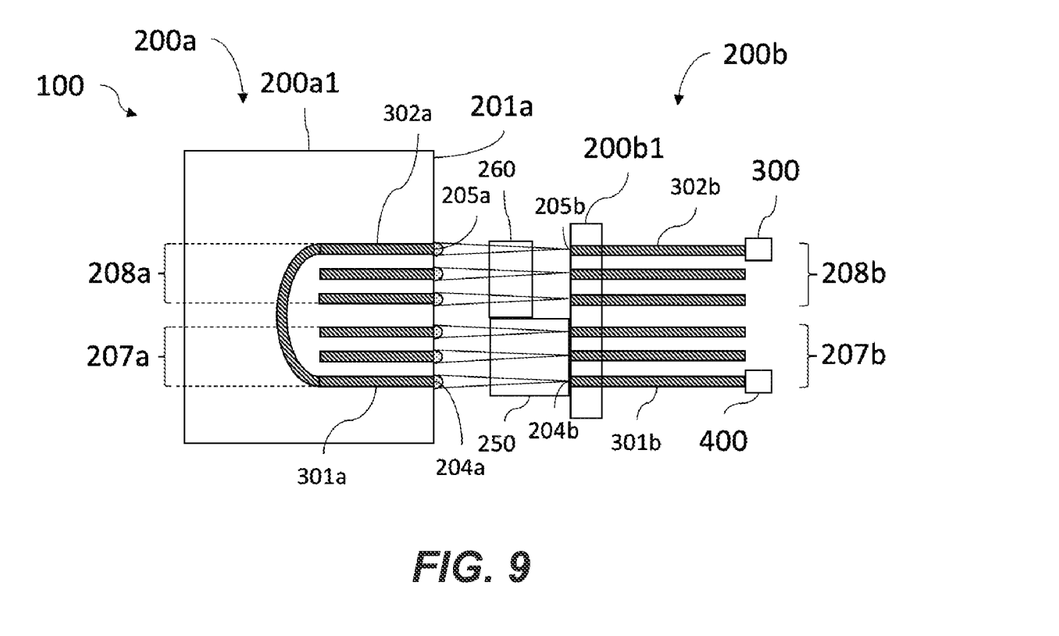
FIG. 9 is a schematic representation of a photonic assembly of FIG. 6, to which active alignment means are added according to a first variant of the first embodiment of the present disclosure.
Figure 10:
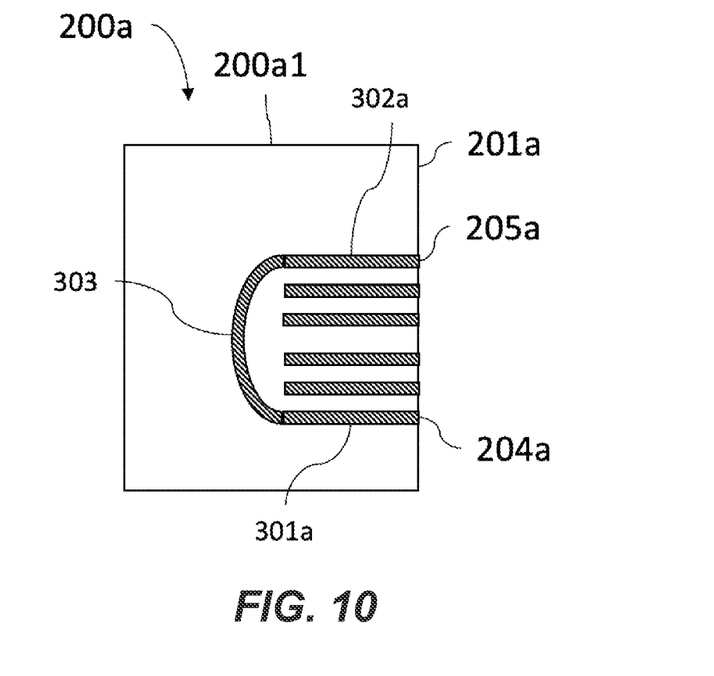
FIG. 10 is a schematic representation of the photonic device of FIG. 9 and represented according to the same modalities of FIG. 9.
Figure 11:
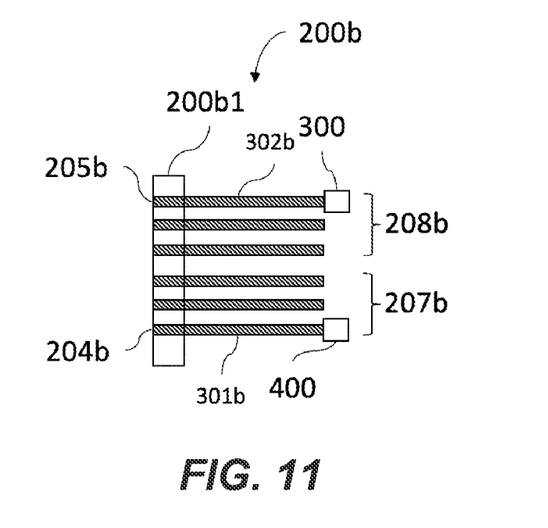
FIG. 11 is a schematic representation of the photonic element of FIG. 9 and represented according to the same modalities of FIG. 9.

According to a first variant of this first embodiment illustrated in FIG. 9, FIG. 10 and FIG. 11, the photonic assembly 100 is provided with active alignment means. By "active alignment means" is meant means configured to optimize the optical coupling between the at least one first output 202a and the at least one second input 202b on the one hand, and between the at least one second output 203b and the at least one first input 203a on the other hand.

In particular, the active alignment means comprise a first alignment input 205a, a first alignment output 204a, a second alignment input 204b and a second alignment output 205b selected from, respectively, the at least one first input 203a, the at least one first output 202a, the at least one second input 202b and the at least one second output 203b. In particular, the first alignment output 204a and the second alignment input 204b are optically coupled and define a first alignment path in that order, the second alignment output 205b and the first alignment input 205a are optically coupled and define a second alignment path in that order.

According to this first embodiment, the active alignment means are arranged such that light radiation entering the photonic device 200a through the first alignment input 205a exits through the first alignment output 204a.

To this end, the active alignment means may also include an alignment output guide 301a and an alignment input guide 302a selected from, respectively, the at least one output guide 207a and the at least one input guide 208a. In particular, the alignment output guide 301a and the alignment input guide 302a each include an end flush with the first face 201a and forming, respectively, the first alignment output 204a and the first alignment input 205a. Furthermore, the alignment output guide 301a and the alignment input guide 302a are optically linked together by the other of their ends, in particular, by means of a waveguide, referred to as a linking waveguide 303.

The active alignment means may include an alignment input fiber 301b and an alignment output fiber 302b selected from, respectively, the at least one input fiber 207b and the at least one output fiber 208b.

The active alignment means may also include an alignment laser 300 and a photodetector 400. Notably, the alignment laser 300 may be arranged to inject light radiation at an end of the alignment output fiber 302b opposite the second alignment output 205b.

Equivalently, the photodetector 400 may be arranged to detect light radiation guided by the alignment input fiber 301b at an end, referred to as the detection end, opposite the second alignment input 204b.

Thus, light radiation emitted by the alignment laser 300 will be transmitted from the second alignment output 205b to the photonic device 200a through its first alignment input 205a to exit through the first alignment output 204a. The light radiation will then be transmitted back to the photonic element through the second alignment input 204b to be detected at the detection end by the photodetector 400.

This arrangement is particularly advantageous when it comes to precise optical alignment of the photonic device and the photonic element. In particular, the optical alignment can include optimization and, more particularly, maximization of the intensity of the light radiation detected by the photodetector 400.

Figure 12:
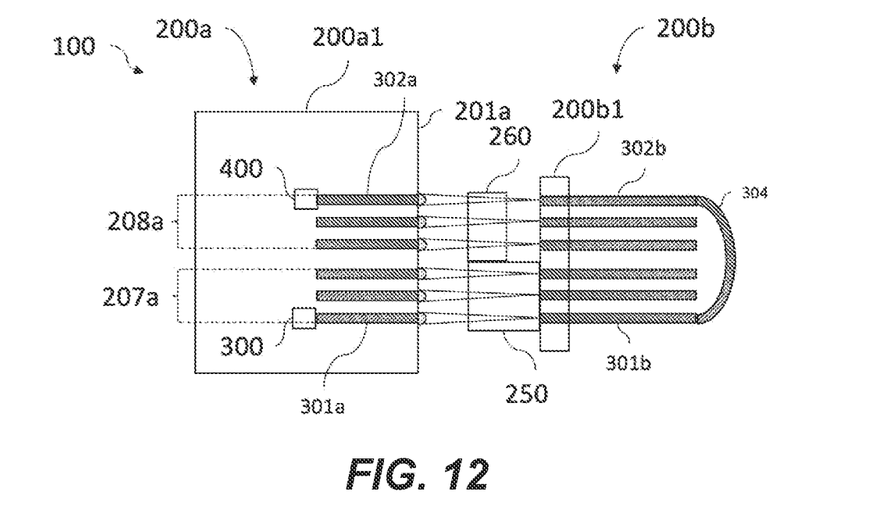
FIG. 12 is a schematic representation of a photonic assembly of FIG. 6, to which active alignment means are added according to a second variant of the first embodiment of the present disclosure.
Figure 13:
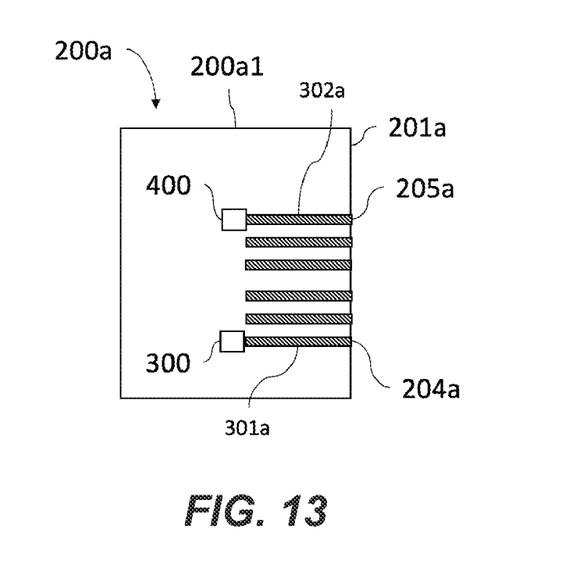
FIG. 13 is a schematic representation of the photonic device of FIG. 12 and represented according to the same modalities of FIG. 12.
Figure 14:
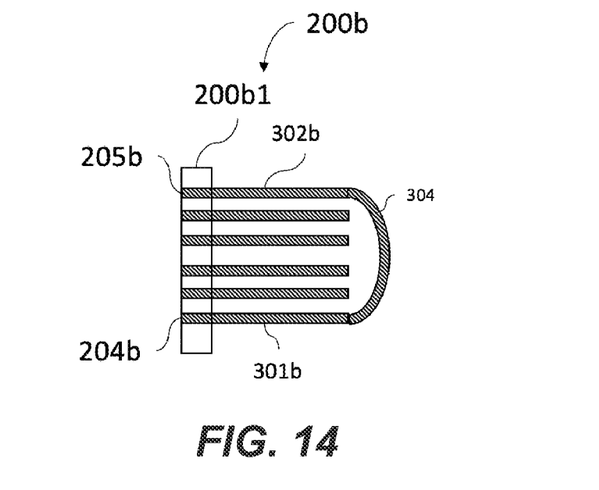
FIG. 14 is a schematic representation of the photonic element of FIG. 12 and represented according to the same modality of FIG. 12.

FIG. 12, FIG. 13 and FIG. 14 illustrate a second variant of implementation of the active alignment means. This second variant essentially has the same features as the first variant. However, the second variant differs from the first variant in that the active alignment means are arranged such that light radiation entering the photonic device 200a through the second alignment input 204b exits through the second alignment output 205b, and is devoid of the connecting waveguide 303. Also, according to this second embodiment, the alignment laser 300 and the photodetector 400 are arranged to cooperate with, respectively, the alignment output guide 301a and the alignment input guide 302a. Notably, the alignment laser 300 may be arranged to inject light radiation at an end of the alignment output guide 301a opposite the first alignment output 204a. Also, the photodetector 400 may be arranged to detect light radiation guided by the alignment input guide 302a at an end, referred to as the detection end, opposite the first alignment input 205a.

Finally, according to this second variant, the alignment input fiber 301b and the alignment output fiber 302b are optically linked together by one of their ends, opposite the second alignment input and the second alignment output respectively. To this end, this optical link uses an optical fiber, referred to as a linking optical fiber 304.

Figure 15:
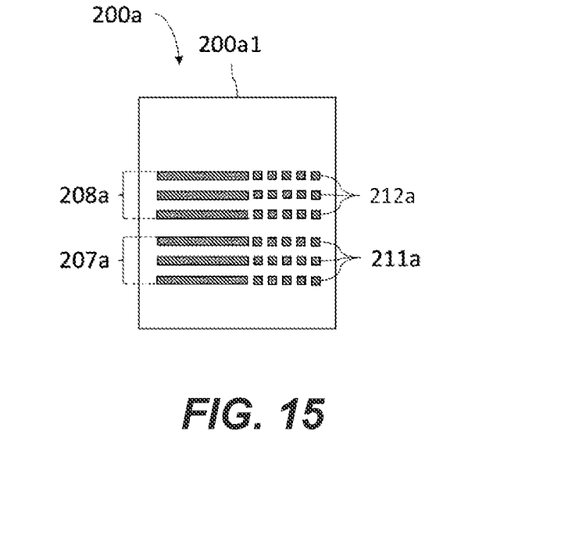
FIG. 15 is a schematic representation of a photonic device that can be implemented in a second embodiment of the present disclosure, in particular, the photonic device is represented according to a cross-sectional plane parallel to the first face and includes the waveguides of the photonic device.
Figure 16:
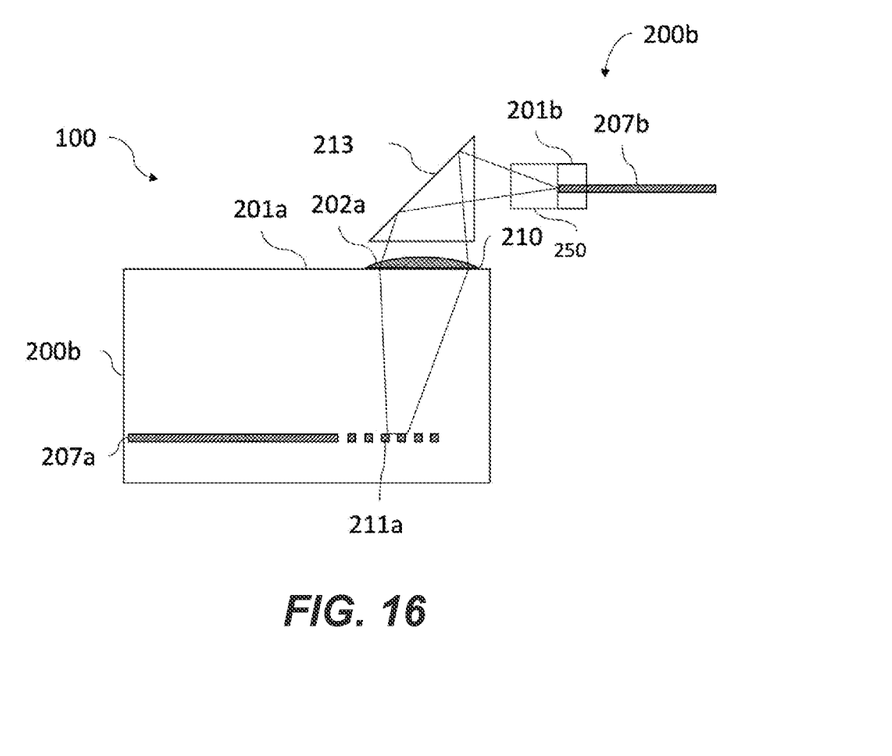
FIG. 16 is a representation of a photonic assembly according to the second embodiment of the present disclosure, in particular, the photonic assembly is shown in a torque plane perpendicular to the first face and includes an output guide.
Figure 17:
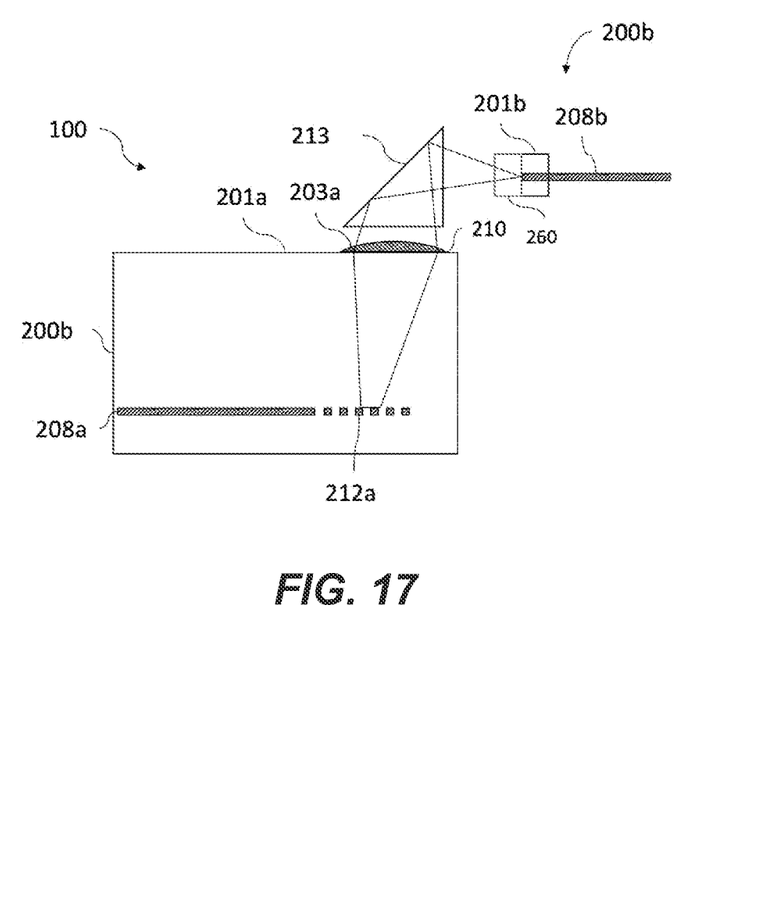
FIG. 17 is a representation of a photonic assembly according to the second embodiment of the present disclosure, in particular, the photonic assembly is shown in a torque plane perpendicular to the first face and includes an input guide.

The disclosure also relates to a second embodiment that essentially repeats the elements relating to the first embodiment. According to this second embodiment, however, the optical coupling between the photonic device and the photonic element is performed via the surface (FIG. 15, FIG. 16 and FIG. 17).

Thus, and unlike the arrangement proposed in the first embodiment, the at least one first output 202a and the at least one first input 203a do not form the ends, respectively, of the at least one output guide 207a and the at least one input guide 208a.

According to the second embodiment, the at least one output grating 211a and the at least one input grating 212a extend along a plane parallel to the first face 201a. The photonic device 200a also includes diffraction gratings and, more particularly, at least one output grating 211a and at least one input grating 212a in continuation, respectively, of the at least one output guide 207a and the at least one input guide 208a.

More particularly, the at least one output grating 211a is in correspondence with the at least one first output 202a. Thus, radiation guided by the at least one output guide 207a will be projected toward the at least one first output 202a for extraction through the at least one first output 202a (FIG. 16).

Equivalently, the at least one input grating 212a is in correspondence with the at least one first input 203a. Thus, radiation injected from the at least one first input 203a will be projected onto the at least one input grating 212a and then guided through the at least one input guide 208a (FIG. 17).

Similar to the first embodiment, the photonic assembly 100 according to the second embodiment may include lenses 210. The lenses rest on the first face 201a and cooperate with the at least one first input 203a (FIG. 17) and the at least one first output 202a (FIG. 16). In particular, each first output 202a is associated with a lens of its own, so that light radiation extracted by the first output passes through the lens in question. Equivalently, each first input 203a is associated with a lens of its own, so that light radiation, before being injected by the first input, passes through the lens under consideration.

The photonic assembly 100 may also include a prism 213 disposed on the first path and the second path for enabling optical coupling between the at least one first output with the at least one second input on the one hand, and between the at least one second output with the at least one first input on the other hand.

The implementation of the blade within the photonic assembly according to the terms of the present disclosure thus optimizes the coupling between the at least one second output and the at least one first input when an optical isolator is interposed on the first path.

Of course, the disclosure is not limited to the embodiments described and alternative embodiments may be made without departing from the scope of the invention as defined by the claims.

What is claimed is:

1. A photonic assembly, comprising:
    a photonic device comprising a first block including at least one output guide and at least one input guide cooperating with, respectively, at least one first output and at least one first input arranged on a first face of the first block;
    a photonic element including at least one second output and at least one second input, arranged on a second face of the photonic element, and optically coupled with the at least one first input and the at least one first output, respectively;
    an optical isolator interposed on a first light propagation path between the at least one first output and the at least one second input, the optical isolator imposing a first mode size on radiation propagating along the first light propagation path; and
    adjustment means interposed on a second light propagation path between the at least one first input and the at least one second output, the adjustment means being configured to impose on a radiation, propagating along the second light propagation path, a second mode size equal to the first mode size, wherein the adjustment means comprises a plate of a thickness Te, the plate comprising a material of optical index Ne, the thickness Te and the optical index Ne being such that the second mode size is equal to the first mode size.

2. The photonic assembly of claim 1, wherein the optical isolator has an optical index Ni and a thickness Ti, and is combined with a first material of optical index Noi and cumulative thickness Toi interposed on the first light propagation path, the plate is combined with a second material of optical index Noe and cumulative thickness Toe interposed on the second light propagation path, the optical index Ni, thickness Ti, optical index Noi, cumulative thickness Toi, optical index Noe, cumulative thickness Toe, optical index Ne and thickness Te satisfying the following relationship:

$$\frac{Te}{Ne} + \frac{Toe}{Noe} = \frac{Ti}{Ni} + \frac{Toi}{Noi}.$$

3. The photonic assembly of claim 1, further comprising active alignment means that comprise a first alignment input, a first alignment output, a second alignment input and a second alignment output selected from, respectively, the at least one first input, the at least one first output, the at least one second input, and the at least one second output, wherein the first alignment output and the second alignment input are optically coupled and define a first alignment path in that order, and wherein the second alignment output and the first alignment input are optically coupled and define a second alignment path in that order.

4. The photonic assembly of claim 3, wherein the active alignment means are arranged such that light radiation entering the photonic device through the first alignment input exits through the first alignment output or such that light radiation entering the photonic element through the second alignment input exits through the second alignment output.

5. The photonic assembly of claim 4, wherein the active alignment means comprises an alignment laser and a photodetector arranged in a first arrangement or a second arrangement, the first arrangement allowing radiation emitted by the alignment laser, before reaching the photodetector, to follow the first alignment path and the second alignment path in order, the second arrangement allowing radiation emitted by the alignment laser, before reaching the photodetector, to follow the second alignment path and the first alignment path in order.

6. The photonic assembly of claim 5, further comprising at least one laser cooperating with the at least one output guide.

7. The photonic assembly of claim 1, wherein the first face and the second face face each other, with the optical isolator interposed between the at least one first output and the at least one second input, and the adjustment means interposed between the at least one first input and the at least one second output.

8. The photonic assembly of claim 1, wherein the at least one output guide terminates along one end thereof in the at least one first output and the at least one input guide terminates along one end thereof in the at least one first input.

9. The photonic assembly of claim 1, wherein the at least one output guide and the at least one input guide extend in a plane parallel to the first face.

10. The photonic assembly of claim 9, wherein the at least one output guide terminates along one end thereof in a diffraction grating in correspondence with the at least one first output, and the at least one input guide terminates along one end thereof in another diffraction grating in correspondence with the at least one first input.

11. The photonic assembly of claim 9, wherein the photonic assembly comprises a prism disposed on the first light propagation path and the second light propagation path.

12. The photonic assembly of claim 1, further comprising an array of optical fibers mounted in grooves of a second block bearing the second face.

13. The photonic assembly of claim 1, further comprising lenses resting on a first side and cooperating with the at least one first input and the at least one first output.

14. A method of forming a photonic assembly, comprising the following steps:
    a step of providing a photonic device comprising a first block including at least one output guide and at least one input guide cooperating with, respectively, at least one first output and at least one first input arranged on a first face of the first block;
    a step of providing a photonic element including at least one second output and at least one second input, arranged on a second face of the photonic element;

a step comprising arranging an optical isolator interposed on a first light propagation path between the at least one first output and the at least one second input, and imposing a first mode size on a radiation propagating along the first light propagation path;

a step comprising arranging an adjustment device interposed on a second light propagation path between the at least one first input and the at least one second output, the adjustment device being configured to impose on a radiation propagating according to the second light propagation path a second mode size equal to the first mode size, wherein the adjustment device comprises a plate of a thickness Te, the plate comprising a material of optical index Ne, the thickness Te and the optical index Ne being such that the second mode size is equal to the first mode size; and an optical coupling step comprising optically coupling the at least one second output and the at least one second input with, respectively, the at least one first input and the at least one first output.

15. The method of claim 14, wherein the optical isolator has an optical index Ni and a thickness Ti, and is combined with a first material of optical index Noi and cumulative thickness Toi interposed in the first light propagation path, the plate is combined with a second material of optical index Noe and cumulative thickness Toe interposed on the second light propagation path, the optical index Ni, thickness Ti, optical index Noi, cumulative thickness Toi, optical index Noe, cumulative thickness Toe, optical index Ne and thickness Te satisfying the following relationship:

$$\frac{Te}{Ne} + \frac{Toe}{Noe} = \frac{Ti}{Ni} + \frac{Toi}{Noi}.$$

16. The method of claim 14, wherein the optical coupling step implements an active alignment device, the active alignment device comprising a first alignment input, a first alignment output a second alignment input and a second alignment output selected from, respectively, the at least one first input, the at least one first output, the at least one second input and the at least one second output, wherein the first alignment output and the second alignment input are optically coupled and define in that order a first alignment path, wherein the second alignment output and the first alignment input are optically coupled and define in that order a second alignment path, and wherein the optical coupling step comprises emitting light radiation that when it travels along one of the first alignment path or the second alignment path then travels along the other of the first alignment path or the second alignment path.

17. The method of claim 16, wherein the active alignment device is arranged such that light radiation entering the photonic device through the first alignment input exits through the first alignment output or such that light radiation entering the photonic element through the second alignment input exits through the second alignment output.

18. The method of claim 17, wherein the optical coupling step comprises emitting light radiation from an alignment laser and detecting the radiation by a photodetector, the alignment laser and the photodetector being arranged in a first arrangement or a second arrangement, wherein the first arrangement allows radiation emitted by the alignment laser, before reaching the photodetector, to follow the first alignment path and the second alignment path in order, and wherein the second arrangement allows radiation emitted by the alignment laser, before reaching the photodetector, to follow the second alignment path and the first alignment path in order.

* * * * *